M. Morton,

Bee Hive.

No. 101,647. Patented Apr. 5, 1870.

Witnesses.
E. Congill
F. Asper

Inventor:
Marcus Morton.

United States Patent Office.

MARCUS MORTON, OF GALLATIN, MISSOURI.

Letters Patent No. 101,647, dated April 5, 1870.

IMPROVEMENT IN BEE-HIVES.

The Schedule referred to in these Letters Patent and making part of the same.

I, MARCUS MORTON, of Gallatin, in the county of Daviess and State of Missouri, have invented an Improvement in the construction of Bee-Hives, whereby certain protection against the bee-moth is secured, which I denominate a moth-decoying bee-hive, of which the following is a specification.

Nature and objects of the Invention.

My hive is constructed in the usual square-box form, of oblong proportion. At the top are two movable honey-boxes; the bee-home may be arranged for movable comb-frames, or in any form to suit the fancy or wishes of the bee-keeper. At the bottom is a drawer with double floors, the upper one being concave, with a convex screen-wire, over which is the entrance for the bees. Under both sides of this convex bottom is a wire, on which are strung old honey-combs, which are the decoy for the bee-moth. Holes are made on either side of the hive for the moth to enter into the drawer, which entrances are different from the entrance for the bees. The bee clippings from the hive above fall through the screen-wire onto the floor of the drawer, where the moth lays her eggs, as she will also do in the combs on the wire.

The hive is so constructed that the moth cannot penetrate up into the home of the bees.

The bee moth will not enter the hive at the usual access for the bees, and will even force an entrance through the sides where the wood of the hive has decayed, if she can find no other means of access. Sentinels are always at the entrance defending it against the approach of all enemies. To allow the moth to enter freely I make holes at the sides of the hive, but she can only find access through these holes to the drawer. The form of the construction of this drawer is such that it brings the bees very nearly down to the bottom of the hive, but protected by the screen-wire, which, with the scent of honey coming down through the wire, serves as a decoy, while the combs on the wire under the sides of the drawer, and the chippings from the bees above, serve as nests in which she can hide her eggs, and to which she will promptly and readily resort.

The bee-keeper can remove the drawer as often as necessary and destroy the larvæ, and this process will afford certain and perfect protection to the bees against their enemy, the bee-moth.

It is not the design of my invention to guard the hive against the moth, or to prevent her entering the hive, but I propose to give her free access into the drawer, where I decoy her into depositing her eggs, which can be destroyed, and thus I protect the hive and the bee-home from her ravages.

Description of the Drawings.

The same letters of reference refer to the same parts in the several figures.

Figure 1:
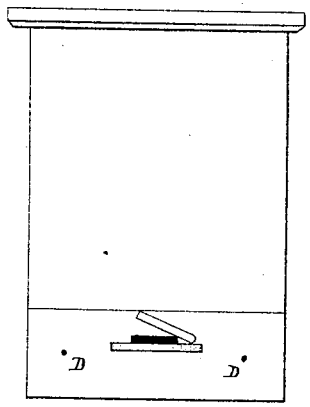
Figure 1 is a front view of the hive.
Figure 2:
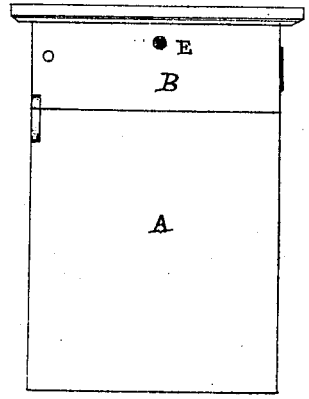
Figure 2 is a rear view of the hive.
Figure 3:
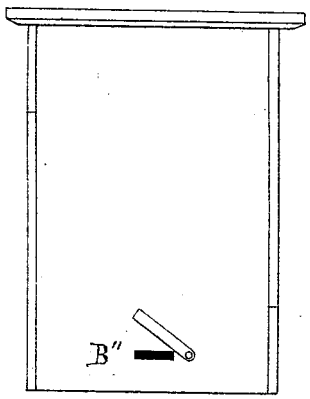
Figure 3 is a side view of the hive.
Figure 4:
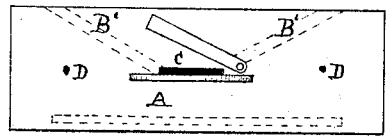
Figure 4 is a sectional view of the drawer.
Figure 5:
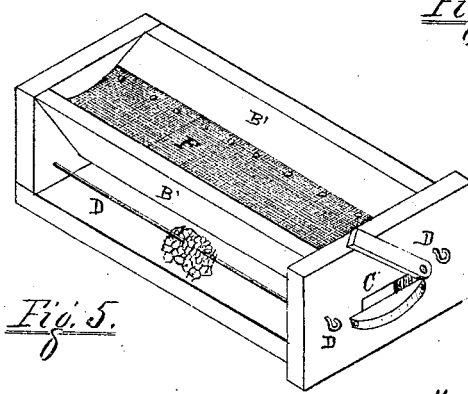
Figure 5 is a perspective view of the drawer.

A is the rear of the hive.
B is a door opening to honey-boxes, on single hinge, secured by wooden buttons.
B' is the inclined sides of the drawer.
B'' is entrance for moth into drawer, with cap screwed to hive at one end to slide over hole.
C is bee-hole, with platform and cap.
D D are wires with decoy comb.
E is a round hole lined with screen-wire, for ventilation and decoy purposes.
F is a screen-wire forming concave bottom to drawer.

Claim.

I claim for my invention the lower drawer with holes at the sides of the hive, for entrance of moth into it, which, with the form of construction in combining the comb on the wires under the inclined portion of roof of drawer, with the concave form with wire-screen at the bottom, the bee entrance directly over this, bringing the bees down near to the chamber formed for the reception of the moth, and the discharge of the bee chippings through the wire-screen to the floor of the drawer, all of which comprise the moth decoy.

MARCUS MORTON.

Witnesses:
H. M. POLLARD,
ELISHA CONGILL.